(12) United States Patent
Nagarkar et al.

(10) Patent No.: US 9,151,668 B1
(45) Date of Patent: Oct. 6, 2015

(54) QUANTUM DOT RADIATION DETECTION, SYSTEMS AND METHODS

(75) Inventors: Vivek Nagarkar, Weston, MA (US); William Lawrence, Medford, MA (US)

(73) Assignee: Radiation Monitoring Devices, Inc., Watertown, MA (US)

( * ) Notice: Subject to any disclaimer, the term of this patent is extended or adjusted under 35 U.S.C. 154(b) by 245 days.

(21) Appl. No.: 13/349,329

(22) Filed: Jan. 12, 2012

Related U.S. Application Data (60) Provisional application No. 61/432,173, filed on Jan. 12, 2011.

(51) Int. Cl.
 G01T 1/20 (2006.01)
 G01J 1/42 (2006.01)

(52) U.S. Cl.
 CPC ........................................ G01J 1/42 (2013.01)

(58) Field of Classification Search
 CPC ............................................................ G01J 1/42
 USPC ....... 250/362, 370.01, 370.09, 361 R, 370.11
 See application file for complete search history.

(56) References Cited

U.S. PATENT DOCUMENTS

| | | | |
|---|---|---|---|
| 7,405,406 B1* | 7/2008 | Nagarkar et al. | 250/366 |
| 7,652,261 B1* | 1/2010 | Wilson et al. | 250/370.11 |
| 7,655,919 B1* | 2/2010 | Shah et al. | 250/370.11 |
| 2005/0020923 A1* | 1/2005 | Frangioni et al. | 600/473 |
| 2006/0054863 A1* | 3/2006 | Dai et al. | 252/301.408 |
| 2008/0017845 A1* | 1/2008 | Drndic et al. | 257/24 |
| 2008/0237470 A1* | 10/2008 | Loureiro et al. | 250/361 R |
| 2010/0013376 A1* | 1/2010 | Maskaly et al. | 313/503 |

FOREIGN PATENT DOCUMENTS

WO  WO 2010120900 A1 * 10/2010

OTHER PUBLICATIONS

Campbell, Ian H. and Brian K. Crone, "Quantum-Dot/Organic Semiconductor Composites for Radiation Detection," *Advanced Materials*, vol. 18, pp. 77-79 (2006).
Dai et al., "Nanocrystal-based Scintillators for Radiation Detection," in *Unattended Radation Sensor Systems for Remote Applications*, ed. J. I. Trombka et al., American Institute of Physics, pp. 220-224 (2002).
Dai, Sheng, "Neutron and Gamma-Ray Radiation Detectors Based on Quantum Dots," Department of Energy's (DOE) Information Bridge: DOE Scientific and Technical Information [online], [retrieved on May 25, 2012]. Retrieved from the Internet <http://www.osti.gov/bridge/servlets/purl/940904-5Lr4HD/940904.pdf>.
Letant, S.E. and T.F. Wang, "Semiconductor Quantum Dot Scintillation under Gamma-Ray Irradiation," *Nano Letters*, vol. 6 (12), pp. 2877-2880 (2006).
Letant, S.E. and T.F. Wang, "Study of Porous Glass Doped with Quantum Dots or Laser Dyes Under Alpha Irradiation," *Applied Physics Letters* 88, 103110-103113 (2006).

\* cited by examiner

*Primary Examiner* — David Porta
*Assistant Examiner* — Abra Fein
(74) *Attorney, Agent, or Firm* — Wilson Sonsini Goodrich & Rosati (57) ABSTRACT

The present invention relates to scintillators and related devices and methods. More specifically, the present invention relates to quantum dot scintillators for use, for example, in radiation detection, including gamma-ray spectroscopy, and X-ray and neutron detection.

13 Claims, 9 Drawing Sheets

QUANTUM DOT RADIATION DETECTION, SYSTEMS AND METHODS

CROSS-REFERENCES TO RELATED APPLICATIONS

The present application claims the benefit of U.S. Provisional Application No. 61/432,173, filed Jan. 12, 2011, which is expressly incorporated herein in its entirety for all purposes.

BACKGROUND OF THE INVENTION

The present invention relates to scintillators and related devices and methods. More specifically, the present invention relates to quantum dot scintillators for use, for example, in radiation detection, including gamma-ray spectroscopy, and X-ray imaging and neutron detection.

The emergence of new and exciting applications, such as those in high-energy nuclear physics and/or X-ray imaging, have demanded detector performance requirements that present the need for novel scintillators with exceptional properties. For example, synchrotron facilities have opened and continue to open avenues of research unthinkable a few years ago; in particular in the area of studying biological and other important materials. The availability of small angle X-ray scattering (SAXS) instruments on third generation synchrotron X-ray sources, with their high intensity and high degree of collimation, has been important for static and time-resolved studies of various non-crystalline biological systems. Other notable applications include static and time-resolved scattering from macromolecules in solution and phase transitions in model membrane systems. However, collecting X-ray data from such partially ordered and disordered systems presents formidable technical challenges. The scattering from those systems is intrinsically weak, and the time scales of interest may be at the millisecond and sub-millisecond level, challenging the ability of existing detectors to capture accurate and detailed data. Thus, while various SAXS instruments at third generation sources can deliver the required flux levels at the sample with exceptional beam quality, the availability of suitable detectors is still a limiting factor.

At present, the most practical design for synchrotron X-ray imaging detectors is based on a CCD optical detector coupled to a scintillating phosphor converter screen, although these detectors are beset with difficulties such as limited imaging area and slow readout speed. In addition, the performance of CCD/CMOS-based high frame rate detectors is limited by the characteristics of the phosphor screen used to convert the incident X-ray flux to visible light. High frame rate applications are inherently light starved, and no current phosphor can provide high enough conversion efficiency to detect low energy X-rays above the noise (dominated by the read noise in high frame rate systems). Low light-conversion efficiency also limits the signal-to-noise ratio (SNR) in measuring weakly diffracted peaks and intrinsically weak scattering from partially ordered and disordered systems, especially when data is acquired on the millisecond or sub-millisecond time scale using integrating detectors. This places constraints on designing detectors with the required active areas, as excessive light loss in coupling large-area screens to the limited-area CCD/CMOS sensors further degrades the SNR.

Furthermore, scintillation spectrometers are now routinely used in medical imaging, diffraction, homeland defense, nuclear waste cleanup, nuclear treaty verification and safeguards, and geological explorations, all of which need scintillators with improved performance, and further emphasize the need for economic, large detectors with, e.g., excellent X-ray/γ-ray response. New inorganic scintillators including rare earth halides such as $LaBr_3$ and $CeBr_3$, their elpasolites, and alkaline earth iodides (such as $CaI_2$ and $SrI_2$) doped with europium, have recently emerged as very promising scintillators for gamma-ray spectroscopy. Many of these materials provide energy resolutions that are a factor of two better than that of NaI:Tl detectors currently used. However, crystal growth of many of the new compositions (e.g., $LaBr_3$ and $CeBr_3$) is very challenging due to their significant anisotropy, leading to crystal cracking and reduced crystal yields, making them very expensive.

Existing scintillator materials and commercial radiation detectors do not meet the current needs for existing techniques for radiation detection of, e.g., ionizing radiation and X-ray imaging. Thus, a need exists for improved scintillator compositions suitable for use in various radiation detection applications.

BRIEF SUMMARY OF THE INVENTION

The present invention provides quantum dot scintillators and related devices and methods. The scintillators of the invention are useful in a variety of applications, including, for example, spectroscopy detection of energetic photons (x-rays and gamma-rays) and imaging applications (e.g., x-ray imaging, PET, SPECT, etc.).

For a fuller understanding of the nature and advantages of the present invention, reference should be had to the ensuing detailed description taken in conjunction with the accompanying drawings. The drawings represent embodiments of the present invention by way of illustration. The invention is capable of modification in various respects without departing from the invention. Accordingly, the drawings/figures and description of these embodiments are illustrative in nature, and not restrictive.

DETAILED DESCRIPTION OF THE INVENTION

The present invention provides quantum dot scintillators and related devices and methods. The scintillators of the invention are particularly useful, for example, for detection and imaging of radiation including, but not limited to, X-rays, gamma rays, neutrons, alpha particles and beta particles.

In one aspect, the present invention provides quantum dot scintillators for imaging and detection of X-rays. Certain aspects of the present invention are based on what is believed to be the first demonstration of X-ray imaging using quantum dots. The thin film quantum dot scintillators of the present invention can provide a wide variety of flexibility in modifying detection characteristics for X-ray imaging. As described herein, several types of quantum dots can be integrated into different host materials. The quantum dots can be tailored to provide fast response times that allow for high frame rate imaging (e.g., at millisecond time resolution or better). Emission wavelengths can be also tailored for specific types of detectors that may, for example, be more sensitive in a certain range of the visible spectrum. The thin film quantum dot scintillators can be further designed to decrease aggregation of the quantum dots while maximizing quantum dot density to allow for increased emission and X-ray absorption characteristics of the thin films. In some embodiments, emission enhancers can be added to further enhance absorption and emission characteristics. Furthermore, the thin films can be fabricated to form uniform, densely packed structures of quantum dots in a host material that provides for high resolution X-ray imaging. The detectors and scintillator screens of the present invention including quantum dot scintillators can be used for improved X-ray imaging applications, such as those imaging X-ray diffraction.

In another aspect, the present invention provides quantum dot scintillators that can be used for gamma ray detection. In some embodiments, the quantum dot scintillators can be fabricated as large volume, thick films to allow for thicknesses and quantum dot densities allowing for improved detection of gamma rays. For example, thick films can be produced to include quantum dots at high densities that can increase stopping power for gamma rays.

Various different quantum dot scintillator compositions are provided herein. The quantum dot scintillators of the present invention can include core-only, core-shell, doped quantum dots (QDs), or combinations thereof. In some embodiments, the quantum dots can be selected from group II-VI semiconductor nanocrystals colloidal quantum dots. The types and characteristics (e.g., size, shape, structure and composition) of the quantum dots used in the scintillators described herein can depend on several factors, such as, e.g., brightness, emission wavelength, decay times, and/or whether a particular quantum dot is suitable for a particular host material and/or emission enhancer described herein. In certain embodiments, the quantum dots described herein can provide fast decay times for high time resolution detection and imaging. In some embodiments, the decay times for quantum dots after excitement from radiation, e.g., X-rays, is on the order of microseconds, and in some embodiments on the order of nanoseconds.

Core-only quantum dots can include, but are not limited to, CdSe, CdTe, and PbSe quantum dots that are grown to have different sizes (e.g., 6-10 nm diameters) and emit at varied wavelengths (e.g., between 400-900 nm). For core-only quantum dots, the excitation and emission frequencies depend on the size and composition of the quantum dot. In some embodiments, core-only quantum dots can provide increased brightness.

Core-shell quantum dots can include a different complementary semiconductor layer on the outside of the initial quantum dot structure that stabilizes the electron-hole pair produced within the core and improves the quantum efficiency of the structure. For example, core-shell quantum dots can include, but are not limited to, CdSe/ZnS quantum dots. Such core-shell quantum dots can exhibit improved fluorescence quantum yield and emit wavelengths ranging, e.g., from 400-605 nm. For core-shell quantum dots, the outer semiconductor layer surrounding an initial quantum dot structure stabilizes the electron-hole pair produced within the core and improves the quantum efficiency of the structure. In some embodiments, the core-shell quantum dots can be a variety of shapes and sizes depending on their desired characteristics. For example, core-shell quantum dots can be nanorods in which the shell forms a nanorod shape around a spherical core. These types of quantum dots can be used to modify detection capabilities of the quantum dot scintillator by, for example, increasing the X-ray absorption cross-section of the quantum dots thereby improving absorption and emission efficiency.

In some embodiments, the quantum dot scintillator compositions can include doped quantum dots. A consideration for some quantum dots involves self-absorption, in which emission from a quantum dot is reabsorbed by adjacent quantum dots in the scintillator. Self-absorption can be problematic because, e.g., it can decrease light output. Potential issues with self-absorption can be addressed by doping quantum dots with impurity atoms that act as the luminescence centers of the quantum dot. The absorption character of the quantum dot can be left unaffected; however, the emission character can be red-shifted to longer wavelengths. The magnitude of the red shift can depend on the type of absorption and/or emission transition involved and/or the utilized impurity atoms. For the quantum dot scintillators described herein, doped quantum dots include quantum dots that are doped with suitable dopants including, but not limited to, Mn, Cu or Ag. In some embodiments, the doped quantum dots can include ZnSe:Mn quantum dots. Due to their large Stokes shift, the ZnSe:Mn quantum dots can improve or altogether eliminate self-absorption among quantum dots, which can occur for core-only and core-shell quantum dots. In addition, given the large red shift, doped quantum dots can be used that absorb, for example, in the UV-blue range (e.g., 390 to 420 nm) and then emit towards the yellow or red range, which is a more sensitive area for silicon-based sensors. With reduced or eliminated self-absorption and more sensitive detection of their emitted wavelengths, doped quantum dots can provide additional flexibility for improving detection characteristics, for example, in X-ray imaging devices.

In addition to quantum dots, the scintillator compositions described herein further include a host material. The host material can be a organic or inorganic material that can provide a structural matrix to hold the quantum dots. In some embodiments, host materials are used to facilitate quantum dot scintillation. For example, details of the mechanism for excitation of the quantum dots can depend on the incident radiation. In some embodiments, incident radiation undergoes inelastic collisions with atoms in the bulk material that eject core electrons to produce hole states and electrons with high excess kinetic energy. These primary charge carriers produce additional secondary charge carriers by impact ionization of the bulk material. The subsequent cascade produces thermalized electrons and holes, which can localize on an individual quantum dot to form an exciton with subsequent radiative relaxation of the exciton and emission of light.

In certain embodiments, the host material can include a polymer. Suitable polymers include, but are not limited to, polystyrene, polyvinyl alcohol, and/or polymethyl methacrylate. Depending on the fabrication methods and the quantum dots employed, a polymer can be selected to be water soluble or soluble in non-polar organic solvents. As described further below, the quantum dots and host material can be prepared as thin films that can be used to produce a wide area imaging film for imaging radiation, such as X-rays. As further described herein, the host material can be used to produce large volume scintillators. These large volume scintillators can be produced as thick films and the host material used can depend on certain fabrication factors to maximize thickness of the film while also accommodating high concentrations of quantum dots.

In certain embodiments, the scintillator compositions including a quantum dot and a host material can further include a quantum dot anti-aggregation agent. The anti-aggregation agents can be added to decrease or eliminate aggregation of quantum dots in the host material. Suitable anti-aggregation agents can include long chain amines, such as octadecylamine (ODA), oleylamine (1-amino-9-octadecene), and hexadecylamine, and/or phosphine oxides, such as trioctyl phosphine oxide (TOPO). The anti-agggeration agents can also be used to passivate the surface of a substrate upon which the scintillator composition is coated. In an exemplary embodiment, quantum dots can be prepared in a solution of 1 g of octadecylamine that is dissolved in 3 mL of octadecene before mixing with other materials to form a quantum dot scintillator.

The scintillator compositions can also include a quantum dot emission enhancer. In some embodiments, emission enhancers are added into the host material to respond to incoming radiation and/or to improve trapping efficiency of the electrons and holes generated in the host material by incident radiation. Upon excitation of the enhancer, the absorbed energy can be transferred to adjacent quantum dots as a secondary excitation pathway. The secondary excitation of the quantum dots, which also absorb and emit after interaction with incoming radiation, increases the light output of the quantum dot scintillators described herein. Suitable emission enhancers can include, but are not limited to, polymers (e.g., 2,5-diphenyl oxazole), metal nanoparticles (e.g., gold), and other agents that can transfer (radiatively or non-radiatively) energy to the quantum dots.

In some embodiments, quantum dot emission enhancers include, for example, 2,5-diphenyl oxazole (PPO). PPO can be used in the quantum dot scintillators in which free charge carriers produced by incident ionizing radiation generates electronically excited PPO molecules. The PPO can relax to produce energy at 340 nm, which can be absorbed (radiatively or non-radiatively) by quantum dots contained in the host material. For example, when the quantum dot sample is mixed with PPO, the quantum dots can be excited by both the exciton trapping of the electron hole pair from the host material, and by non-radiative energy transfer (e.g., Förster resonance energy transfer) from PPO to the quantum dot. In some embodiments, PPO can also be combined with 1-4,bis-2-(5-phenyloxazolyly)-benzene (POPOP) to shift the emission wavelength to 400 nm where the electronically excited POPOP is produced by non-radiative energy transfer from PPO to POPOP.

The concentration of the emission enhancer may depend on the type of enhancer and/or solvents being used during the manufacture of the scintillator films. For example, concentration of PPO ranges from about 1% to about 15%, from about 1% to about 10%, or from about 1% to about 5%. For other types of enhancers, e.g., gold particles, concentrations can depend factors in which a certain amount can be added to maximize density of the enhancer (to maximize absorption) while also providing minimal attenuation of the incident radiation. In certain embodiments, gold particles can range in concentration from about 0.1% to 1% by weight.

The scintillator compositions of the invention may be prepared in several different forms. The forms of the quantum dot scintillators can depend on the type of radiation being detected. For example, in some embodiments, the compositions are in the form of a thin film for X-ray detection. However, the compositions can include other forms as well, and the selected form may depend, in part, on the intended end use of the scintillator. Other forms of scintillation compositions will be recognized and can include, for example, glasses, deposits, and the like. The scintillators can be rigid or flexible. It should also be understood that a scintillator composition might contain small amounts of impurities. Also, minor amounts of other materials may be purposefully included in the scintillator compositions to affect the properties of the scintillator compositions.

The present invention includes methods of making the quantum dot scintillators described herein using a variety of techniques that, for example, can depend on the desired application. In certain embodiments, the methods of making include preparing the quantum dot scintillator compositions described herein as a thin film. In some embodiments, the thin films can be useful in detecting and/or imaging X-rays. The thin films can be formed, for example, by slow speed spin coating or by draw rod casting on a substrate (e.g., a fiber optic faceplate). Fabrication methods, such as spin coating, can be used to produce high quality, uniform films of a desired thickness that can be controlled by the number of coating procedures performed to make the film. The technique used to produce the films can depend on a variety of factors, such as the host material being used, the desired thickness, and/or the desired concentration of quantum dots.

In some embodiments, the preparation of the thin film of quantum dot—polymer composite materials can involve compatibility between the quantum dot and polymer, and also a compatible solvent system for both components. For example, water soluble core-only quantum dots (e.g., CdTe) can be fabricated using aqueous synthesis methods and the final QD product is water-soluble. The quantum dots can be suspended in the polymer matrix by adding a water-soluble polymer (e.g., a polyvinyl alcohol (PVA) polymer) to the solution. The water soluble polymer (e.g., PVA) can be added directly to a solution having the quantum dots, or the polymer can be dissolved in water and added to the quantum dot solution depending on the desired ratio of quantum dot to PVA. In certain embodiment, the solutions can be heated but kept below 100° C. to improve the rate of PVA dissolution. Mixing temperatures can depend on the type of polymer being used as well as other factors, such as any additional components that may be added to improve characteristics of the quantum dots and/or the polymer film. In exemplary embodiments, dry films can be produced to include 35%, 10% and 0.2% wt quantum dot in PVA. For example, the drawdown rod method can be used to cast a film of 10% quantum dot on a glass microscope slide. In other embodiments, non-polar quantum dots (e.g., CdSe quantum dots or ZnSe:Mn doped quantum dots) can be dissolved in a non-polar solvent, such as chloroform or toluene, and then mixed with a non-polar polymer, such as, e.g., polystyrene polymer, that is compatible with the organic solvent.

In certain embodiments, the thin films can be fabricated to optimize density of the quantum dots high light output. High densities of quantum dots can be desired to increase absorption and therefore emission in response to incident radiation, e.g., X-rays. However, quantum dots can tend to aggregate together under certain conditions. The present invention provides methods for producing films with high density and minimal aggregation. In one embodiment, the present invention thin films can be cured from the outside of the film and then inward towards the center of the film. As the curing moves from the outside of the film inward, the quantum dots can be pushed towards the center of the film and packed in high density.

Thin film quantum dot scintillators can be prepared to include a wide range of quantum dot concentrations. For example, the concentration of quantum dots in the polymer matrix can range from about 0.1% to about 50% weight (wt), from about 0.1% to about 35% wt, from about 0.1% to about 10% weight, and from about 5% to about 10% weight. Thicknesses of the thin films can range from about 10 µm to about 500 µm, from about 10 µm to about 250 µm, from about 10 µm to about 100 µm, and from about 30 µm to about 100 µm. Depending on the application, large area detection regions may be desired. The area of the scintillator films described herein can range from about 1×1 mm² to about 5×5 cm², or from about 100 mm² to about 1 cm². In certain embodiments, thin films can be coated (e.g., by spin coating) onto commercially available wafers, which can, e.g., have a diameter of 300 mm.

In other embodiments, the present invention provides methods for making quantum dot scintillator compositions as thick films. The thick films can have thicknesses on the order of millimeters or centimeters. Thick films can be used for detecting and/or imaging radiation including gamma rays, neutrons, X-rays, and alpha and beta particles. In some embodiments, the substantially thick films can be used for detecting gamma rays. Quantum dot scintillators including substantially thick films have a cross-sectional thickness that allows for detection of gamma rays. For example, the substantially thick films can have thicknesses that allow for adequate stopping power for gamma ray detection. Bulk polymerization can be used to prepare thick quantum dot polymer composite scintillators. Because no solvent is typically involved during the polymerization process, transparent bulk samples of any shape and size can be formed.

In some embodiments, methods of preparing thick film quantum dot scintillators can include a polymerizable surfactant that can be used to extract quantum dots described herein from an aqueous solution into a monomer solution. For example, a polymerizable surfactant of octadecyl-p-vinyl-benzyl dimethylammonium chloride (OVDAC) can be synthesized and used to extract the quantum dot nanocrystals from water into a monomer, such as methylmethacrylate (MMA) or styrene. The monomer phase can be separated and then polymerized using an initiator. For example, the monomer phase can be separated and polymerized in a glass vial in an oil bath at elevated temperature for ~20 h using an initiator. Using this procedure, transparent thick film quantum dot scintillators described herein can be obtained. For example, CdTe-PMMA or polystyrene composites can be obtained and a similar procedure can be applied to form doped CdSe/ZnSe scintillators.

The thick films of the present invention can range, for example, from about 1 mm to about 3 cm, from about 5 mm to about 2.5 cm, and from about 20 mm to about 2 cm, from about 500 mm to about 2 cm, or from about 1 cm to about 2 cm. Quantum dots can be present at a variety of concentrations. Concentration can depend on factors such as brightness, aggregation, scattering and the like. Quantum dot concentrations can range from about 0.5% wt to about 80% wt, from about 1% wt to about 50% wt, from about 10% wt to about 40% wt, and from about 20% wt to about 30% wt.

In certain embodiments, the density of quantum dots can be tailored to produce a higher effective Z value, which promotes interaction and greater stopping power for gamma rays. To increase the Z value, quantum dots can be loaded into the thick films at concentrations of at least 20-30% wt, and in some embodiments up to about 80% wt. Methods of making thick films having high concentration of quantum dots can include producing a highly concentrated solution of quantum dots in aqueous or organic solvents before transferring the quantum dots to a polymer solution that is later cured. Quantum dots can be concentrated in solution by precipitation of the quantum dots into dry powders that can be re-dispersed at a high concentration. Aggregation can be addressed by adding anti-aggregation agents and/or modifying the surface chemistry of the quantum dots.

Another consideration for detectors based on quantum dots is achieving the needed density of quantum dots while maintaining adequate separation to prevent the light attenuating effects caused by the agglomeration of highly scattering particles. In certain instances, a higher concentration of quantum dots can translate to a higher the detection efficiency, but emitted light may be increasingly scattered as the particle concentration increases and decrease the amount of light reaching the optical detectors. Light scattering characteristics can depend on particle size, shape, structure, composition, and the wavelength distribution of the incident light. To address scattering, quantum dots can be coated with coating materials, such as $SiO_2$ (which can offer a wide range of refractive indices) as well as $Al_2O_3$, $Y_2O_3$, ZnO, MgO, and $In_2O_3$.

In some embodiments, fabrication processes may optionally include cleaning and/or chemically modifying a substrate (e.g., a fiber optic plate) surface to enhance adhesion of the polymer. In addition, the processes can include forming one or more coatings (e.g., protective or reflective coatings) on a surface of a scintillator. Formation of protective coatings atop the deposited material may be performed in situ; i.e., without breaking the vacuum, after completion of the scintillator film deposition cycle. This can include use of an evaporator equipped with sources of protective and reflective materials. An alternate approach is a specialized substrate holder equipped with a spring-loaded window. The window remains open during the scintillator film deposition and is closed after the deposition, before the vacuum is broken with dry $N_2$ gas (typically used to leak the vacuum), using a mechanical trigger located outside of the evaporation chamber. The closed substrate holder, filled with the dry $N_2$, is quickly transferred to a dry chamber for storage.

Protective coatings, such as a para-xylylene polymer composition (e.g., Parylene) coating, can be used as a hermetic sealing layer on scintillator films. Para-xylylene polymer has a very low density and low atomic number, so the incident X-ray/gamma ray flux is not appreciably attenuated in this coating. An approximately 5 µm thick coating is formed by vapor deposition. A reflective layer of aluminum can similarly be deposited on top of the polymer layer. Alternatively, a top cover with a white Teflon reflector can be emplaced with epoxy.

The present invention further provides radiation detection devices or detector assemblies that include the quantum dot scintillators described herein. In one aspect, the present invention includes a radiation detector comprising a quantum dot scintillator, the scintillator operably couplable to a photodetector assembly. In another aspect, the present invention includes a X-ray imaging device, comprising a quantum dot scintillator composition comprising a quantum dot and a host material, the scintillator operably couplable to a photo detector assembly. In yet another aspect, the present invention includes a gamma ray detection device, comprising a thick film quantum dot scintillator composition comprising a quantum dot and a host material, the scintillator composition operably couplable to a photodetector assembly for detecting X-rays.

In certain embodiments, the quantum dot-polymer composite scintillator compositions may be coupled to a substrate. In certain embodiments, the quantum dot scintillator and the substrate can be a scintillator screen that can be separate from a detector device and/or comprise a detector portion (e.g., scintillator panel) that can be adapted to or incorporated into a detection device or assembly. In some embodiments, the substrate can be a detector device or portion or surface thereof (e.g., optical assembly, photodetector, etc.). Non-limiting substrate examples may include amorphous carbon, glassy carbon, graphite, aluminum, sapphire, beryllium, or boron nitrate. A substrate may include a fiber optic plate, prism, lens, scintillator, or photodetector.

As set forth above, scintillator compositions of the present invention may find use in a wide variety of applications. In one embodiment, for example, the invention is directed to a method for detecting energy radiation (e.g., gamma-rays, X-rays, neutron emissions, alpha particles, beta particles and the like) with a scintillation detector including the scintillation composition of the invention. In certain embodiments, the quantum dot scintillators can be produced as thin films and used for X-ray imaging. In some embodiments, the quantum dot scintillators can be produced as thick films and used for detection of gamma rays.

Figure 1:
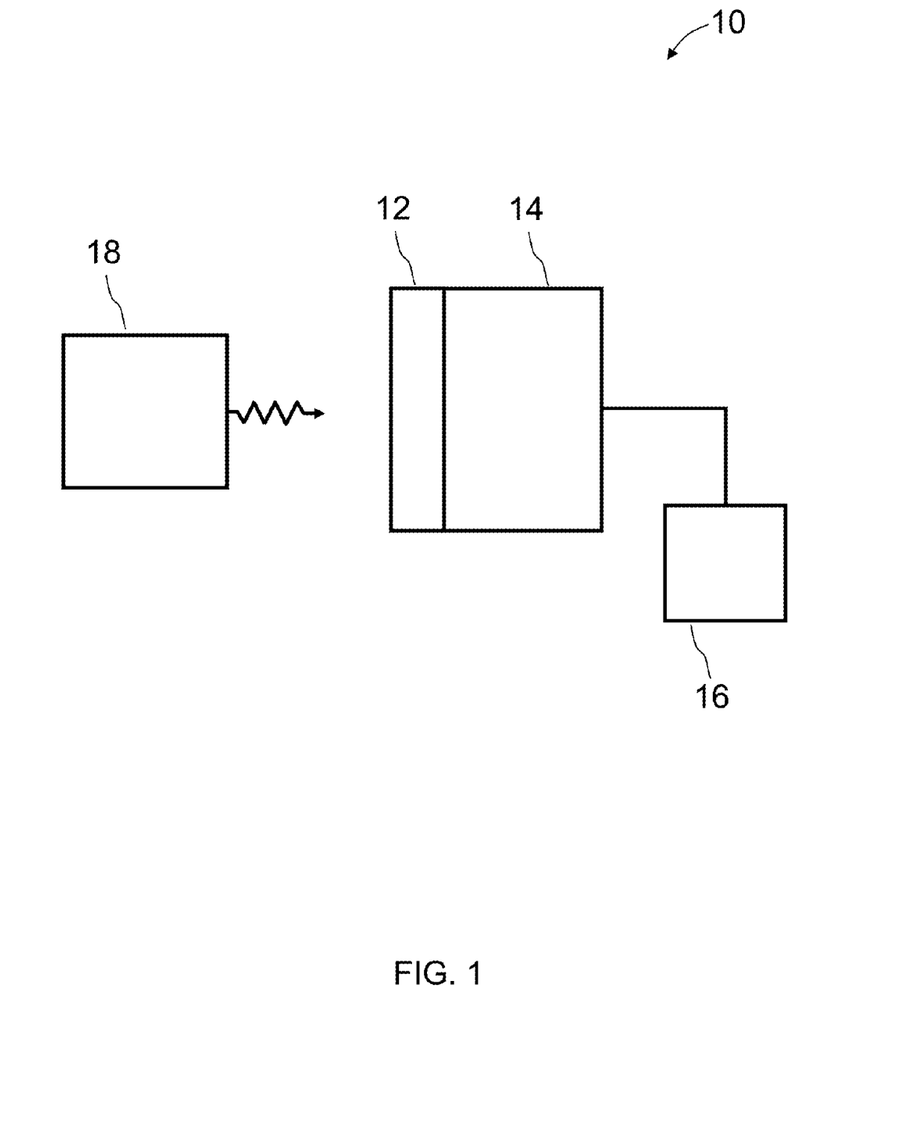
FIG. 1 is a conceptual diagram of a radiation detector device of the present invention.

FIG. 1 is a diagram of a detector assembly or radiation detector of the present invention. The detector 10 includes a scintillator 12 operably coupled to a light photodetector 14 or imaging device. The detector assembly 10 can include a data analysis, or computer, system 16 to process information from the scintillator 12 and light photodetector 14. In use, the detector 10 detects energetic radiation emitted form a source 18.

A data analysis, or computer, system thereof can include, for example, a module or system to process information (e.g., radiation detection information) from the detector/photodetectors can also be included in an invention assembly and can include, for example, a wide variety of proprietary or commercially available computers, electronics, or systems having one or more processing structures, a personal computer, mainframe, or the like, with such systems often comprising data processing hardware and/or software configured to implement any one (or combination of) the method steps described herein. Any software will typically comprise machine readable code of programming instructions embodied in a tangible media such as a memory, a digital or optical recording media, optical, electrical, or wireless telemetry signals, or the like, and one or more of these structures may also be used to transmit data and information between components of the system in any of a wide variety of distributed or centralized signal processing architectures.

The detector assembly typically includes material formed from the scintillator compositions described herein (e.g., one or more quantum dots in a host material). The detector further can include, for example, a light detection assembly including one or more photodetectors. Non-limiting examples of photodetectors include photomultiplier tubes (PMT), photodiodes, PIN detectors, charge coupled device (CCD) sensors, image intensifiers, avalanche detectors and the like. Choice of a particular photodetector will depend in part on the type of radiation detector being fabricated and on its intended use of the device. In certain embodiments, the photodetector may be position-sensitive. Detectors can further include imaging devices that can acquire images at high frame rates, such as frame rates that are faster than about 30 frames per second, about 100 frames per second, or about 1000 frames per second.

The detector assemblies themselves, which can include the scintillator and the photodetector assembly, can be connected to a variety of tools and devices, as mentioned previously. Non-limiting examples include nuclear weapons monitoring and detection devices, well-logging tools, and imaging devices, such as nuclear medicine devices (e.g., PET). Various technologies for operably coupling or integrating a radiation detector assembly containing a scintillator to a detection device can be utilized in the present invention, including various known techniques. In certain embodiments, the radiation detector comprises a quantum dot scintillator that is optically coupled to the photodetector. In some embodiments, the X-ray imaging device includes a quantum dot scintillator described herein that is optically coupled to the photodetector. Similarly, scintillator screens can be included in a radiation detector such that the screen is optically coupled to the photodetector.

The detectors may also be connected to a visualization interface, imaging equipment, or digital imaging equipment (e.g., pixilated flat panel devices). In some embodiments, the scintillator may serve as a component of a screen scintillator. Energetic radiation, e.g., X-rays, gamma-rays, neutron, originating from a source, would interact with the scintillator and be converted into light photons, which are visualized in the developed film. The film can be replaced by amorphous silicon position-sensitive photodetectors or other position-sensitive detectors, such as avalanche diodes and the like.

The methods of the present invention further include methods of performing radiation detection. The methods of performing radiation detection can include providing a detection device comprising scintillator composition including a quantum dot and a host material; and a photodetector assembly operably coupled to the scintillator composition; and positioning the device such that a radiation source is within a field of view of the scintillator composition so as to detect emissions from the source. Emissions from the source can include x-rays, gamma-rays, neutrons, alpha particles, beta particles, or a combination thereof. In certain embodiments, a patient can be positioned between the radiation source and the scintillator composition. In some embodiments, the radiation source includes a patient. In certain embodiments, the detection device is a X-ray imaging device and the quantum dot scintillator is optically coupled to the photodetector.

Imaging devices, including medical imaging equipment, such as the PET and SPECT devices, and the like, represent other potential applications for the invention scintillator compositions and radiation detectors. Furthermore, geological exploration devices, such as well-logging devices, were mentioned previously and represent an important application for these radiation detectors. The assembly containing the scintillator usually includes, for example, an optical window at one end of the enclosure-casing. The window permits radiation-induced scintillation light to pass out of the scintillator assembly for measurement by the photon detection assembly or light-sensing device (e.g., photomultiplier tube, etc.), which is coupled to the scintillator assembly. The light-sensing device converts the light photons emitted from the scintillator into electrical pulses that may be shaped and digitized, for example, by the associated electronics. By this general process, gamma-rays can be detected, which in turn provides an analysis of geological formations, such as rock strata surrounding the drilling bore holes.

In many of the applications of a scintillator composition as set forth above (e.g., nuclear weapons monitoring and detection, imaging, and well-logging and PET technologies), certain characteristics of the scintillator are desirable, including high light output, fast rise time and short decay time, good timing and spatial resolution, and suitable physical properties. The present invention is expected to provide scintillator materials which can provide the desired high light output and initial photon intensity characteristics for demanding applications of the technologies. Furthermore, the scintillator materials are also expected to be produced efficiently and economically, and also expected to be employed in a variety of other devices which require radiation/signal detection (e.g., gamma-ray, X-ray, neutron emissions, and the like).

The following examples are intended to illustrate but not limit the invention.

EXAMPLES

Example 1: Quantum Dot Synthesis

Synthesis of Cadmium Selenide (CdSe) Quantum Dots

A solution of cadmium nitrate in methanol was added to a solution of sodium myristate, also in methanol. To obtain high quality cadmium myristate, the sodium myristate solution was heated to about 90° C. until all of the particles are dissolved. Afterward, the cadmium nitrate solution was injected slowly, drop-wise, and the reaction was allowed to take place. The temperature was then reduced to room temperature where the cadmium myristate powder began to precipitate below 65° C. The powder was then collected, filtered, and dried in a box oven. The dried cake was then crushed to produce fine particles of cadmium myristate.

The cadmium myristate was then added to selenium powder using the correct stoichiometric ratio and together combined with octadecene in a 3-neck flask and degassed for approximately one hour. This degassing process occurred under vacuum at 110° C. The system was then purge/filled with argon several times before a rise in temperature at the rate of ~2° C. per minute was initiated. Upon reaching ~185° C., the selenium containing solution began to form CdSe quantum dots, as evidenced by the onset of a distinct exciton peak in the absorption spectra. The sulfur containing solution did not begin to form CdS until the temperature had reached ~230° C. Whereas the temperature was further raised to over 200° C. for CdSe quantum dot synthesis, a relatively constant 230-250° C. was maintained in the case of CdS quantum dots. Controlling emission color of the CdSe quantum dots was performed by controlling particle size, which is a function of the synthesis time and temperature. For example, particles synthesized at T=165° C. for 1 hr had a peak around 469 nm, while those grown at T=246° C. for over 8 hours had an emission peak around 585 nm.

Synthesis of Cadmium Telerium (CdTe) Quantum Dots

Colloidal solutions of CdTe quantum dots in water were prepared in larger batches through the addition of freshly prepared NaHTe precursor to $Cd(ClO_4)_2$ solutions in the presence of Mercaptopropionic Acid (MPA) as stabilizing agents under $N_2$ atmosphere. The ratio of Cd, Te and MPA was optimized to produce highly efficient quantum dots (>80%). The emission color depends on the particle size and thus the growth time. Green emission was obtained for short time (~1 hour) growth and red emission observed after longer time growth (>20 h) at 100° C. 1000 ml of CdTe quantum dots were synthesized in each batch with a concentration of ~0.5 Wt %. The quantum dots were then precipitated from the original solution by adding 2-proponal and centrifuging at 4000 rpm for 10 minutes to collect dry quantum dot powder. These powders were then re-dispersed in $H_2O$ to form the various quantum dot solutions.

Synthesis of Zinc Selenide Manganese-doped Quantum Dots (ZnSe:Mn)

The samples of doped ZnSe:Mn quantum dots were fabricated using an air-free synthesis system consisting of an N2-purged glove box and Ar-purged reaction flasks. The precursors used in the synthesis underwent a vacuum baking or "purification" process prior to nucleation of the quantum dots. The purification step significantly improved the crystallinity of the quantum dots, although excessive baking has led to oxidization.

The challenge in this task was in maintaining the balance needed between Se, Zn, and octadecylamine (ODA) concentrations at all times during the reaction. As the optimum Se:Mn ratio was utilized for ZnSe:Mn quantum dots, additional Se injections would be required to maintain a Se-rich solution during subsequent Zn injections. Additionally, sufficient ODA should be present at all times to prevent particle agglomeration. ZnSe shell material was therefore added in three steps, with intermittent injection of additional Se+ODA solution. During Phase I, both small (~5 nm) and large (~10 nm) particles were synthesized Example 2: Making of Quantum Dot Scintillator Compositions Fabrication of Thin Polymer Films Quantum dot samples were obtained from Phosphortech (Lithia Springs GA). The quantum dots were prepared using solution phase synthesis methods to produce the semiconductor nanocrystals with a narrow size distribution. The surfaces of the quantum dots were coated with an appropriate ligand to stabilize the quantum dots in solution and prevent aggregation. Depending on the synthesis method, the final quantum dots were produced in aqueous or non-aqueous solvent system. The solvent characteristics then impacted the choice of compatible polymer matrix. Quantum dot-polymer thin film samples were prepared using both aqueous CdTe quantum dots in polyvinyl alcohol (PVA) and non-aqueous CdSe quantum dots in polystyrene. Thin films of CdTe quantum dots in polyvinyl alcohol polymer were prepared by casting from an aqueous solution that contained the water soluble quantum dots and the polymer. A 65 micron thick sample was cast on a fiber optic waveguide plate with a 25 mm diameter and 5 mm thickness. CdSe quantum dot doped polystyrene samples were prepared by mixing the styrene monomer with the quantum dot followed by thermal polymerization of the monomer using 2,2'-azobisisobutyronitrile (AIBN) initiator. The polymerization reaction produced solid samples with 10 mm diameter and 5 mm thickness. The top and bottom surfaces of the solid disk samples were polished for better light transmission.

Samples were produced and used to evaluate the high-speed X-ray imaging performance of quantum dot doped thin film polymer composite materials or thin film scintillators. These films were formed by slow speed spin coating or by draw rod casting on a fiber optic faceplate that act as "zero thickness" optical windows for direct transfer of the image from the scintillator to the underlying high resolution CCD camera. The preparation of the thin film of quantum dot—polymer composite materials typically involves compatibility between the quantum dot and polymer, and also a compatible solvent system for both components. The CdTe core-only quantum dots were fabricated using aqueous synthesis methods and the final product is water-soluble. The most straightforward method to suspend these quantum dots in the polymer matrix is to add a water-soluble polymer to the solution. Similarly, the non-polar quantum dots that were dissolved in chloroform or toluene were mixed with a polystyrene polymer that was compatible with the organic solvent. The surfaces of the fiberoptic plates were cleaned and chemically modified to enhance adhesion of the polymer.

ZnSe:Mn quantum dots in chloroform were added to a solution of polystyrene in toluene solvent. The concentration of ZnSe:Mn quantum dots was 0.5%. Samples were prepared using 1 ml of solution (10 mg quantum dot) with 0.9 ml of polystyrene at 100 mg/ml for a total of 90 mg polymer. The mixture was cast into a thin film by covering a fiber optic plate with the solution and allowing the film to dry. This created a 10% by weight film of ZnSe:Mn quantum dots in polystyrene that was 46 μm thick. The ZnSe:Mn doped quantum dots were originally prepared with an excess of octadecylamine (ODA) for surface passivation and to prevent aggregation. The ODA remained in the solution through the casting of the film, and the resulting film was more gel-like than other polystyrene films alone or with quantum dots. The resulting film was optically inhomogeneous and could contain regions with higher concentrations of ODA or quantum dots. Using this same procedure, films were also prepared that contained 10% wt PPO in addition to the ZnSe:Mn.

Polystyrene films were also prepared with the CdSe quantum dots since the CdSe material was dissolved in toluene. Samples of 3% by weight (wt) of the quantum dot in polystyrene were prepared. For these samples, two films were prepared. The first film contained 3% CdSe-535 in polystyrene. The second film contained 3% CdSe-535 and 4% PPO.

Thin film polyvinyl alcohol (PVA)—quantum dot composites were fabricated by deposition using drawdown rods and by spin coating. The CdTe quantum dots from PhosphorTech were produced using aqueous synthesis methods, and the quantum dot products were in water-soluble form. Polyvinyl alcohol is a clear water-soluble polymer that was used as the matrix material for the thin film. The polyvinyl alcohol with a mean molecular weight of 27,000 Dalton was used as received from Sigma Aldrich. The PVA sample could be added directly to the quantum dot solution or dissolved in deionized water and added to the solution depending on the required ratio of quantum to PVA. The solutions were heated but kept below 100° C. to improve the rate of PVA dissolution. Solutions were prepared that would produce dry films with 35%, 10% and 0.2% wt quantum dot in PVA. The drawdown rod method was used to cast a film of 10% quantum dot on a glass microscope slide. Thin films could also be produced by low speed spin coating. Incom fiberoptic waveguide plates were used as the substrate for the thin film.

Fabrication of Thick Polymer Films

Figure 2:
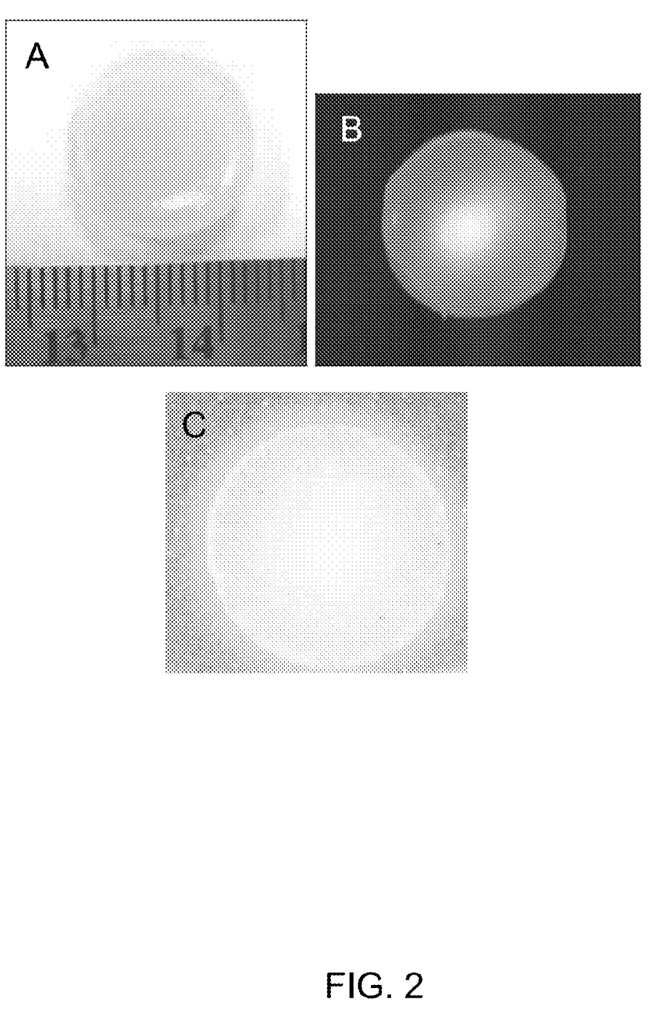
FIG. 2A-2C depict brightfield, UV and X-ray induced fluorescence images of quantum dot-polymer composites, respectively, in accordance with an exemplary embodiment of the invention.

Thick film scintillators were made using ZnSe:Mn quantum dots to produced higher densities with correspondingly high effective Z and emission efficiencies. Thick specimens were fabricated using thermal polymerization of ZnSe:Mn quantum dots blended with styrene monomer. As shown in FIGS. 2A-C, the specimens were approximately 1 cm in diameter and 3 mm thick, with a mean quantum dot concentration of 1%. Aggregation of quantum dots in the center portion of the sample led to higher local concentrations, resulting in the brightest emissions under UV (FIG. 2B) and X-ray (FIG. 2C). In this instance, the aggregation of quantum dots polystyrene is an outcome of the surface ligand of the quantum dots. The ligand in the doped quantum dot is more polar as it is soluble in chloroform and not in toluene. Since polystyrene medium is similar to toluene the spread is poor, where as the non-polar quantum dots in toluene mix well in polystyrene as shown in FIG. 2C. In spite of aggregation, ZnSe:Mn core-shell quantum dots retained their emission properties, indicating efficacy of dense packaging the quantum dots to simultaneously achieve higher γ-ray absorption and brighter light emission.

Example 3: Characterization and Imaging with Quantum Dot Scintillators

Quantum Dot solution phase emission spectra

The emission spectra of the solution phase and solid samples were recorded using the Perkin Elmer LS 50B fluorescence spectrometer. The emission spectra of the samples were recorded upon excitation at 405 nm by scanning the emission monochromator. The minimum slit width was used on both the excitation and emission monochromators and provided 2 nm resolution. In some cases the emission intensity was reduced using inconel neutral density filters to avoid saturating the detector. The absorption spectra were measured over the 300 nm to 800 nm spectral range using a Cary 1E (Varian Associates) double beam spectrometer. Distilled water was used in the reference channel for the aqueous sample measurements. X-ray induced emission spectra were measured using a copper target X-ray generator (8 keV Cu Kα line). The X-ray source was operated at 40 kV with 20 mA current, and the X-ray output was directly incident on the sample. The resulting X-ray induced emission passes through a 0.2 meter McPherson model 234/302 monochromator and the wavelength resolved emission was detected using a photomultiplier tube (RCA C31034).

Figure 3:
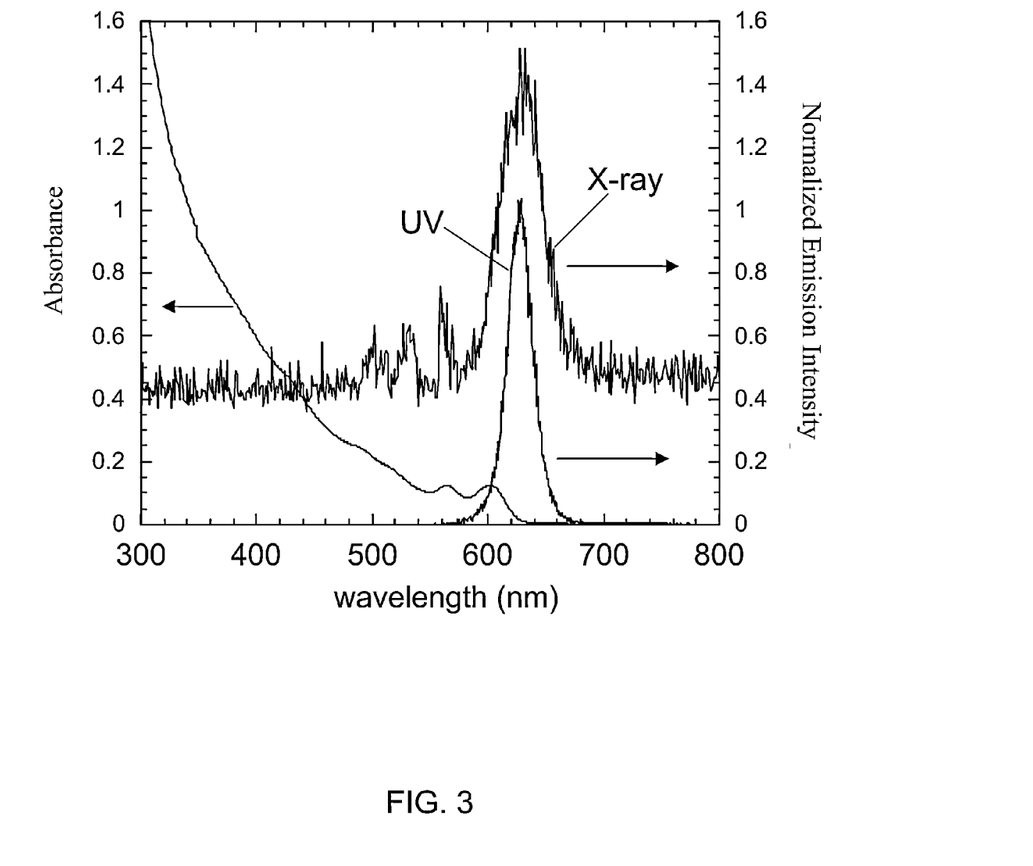
FIG. 3 illustrates absorption and emission spectra of solution phase CdSe quantum dots, in accordance with an exemplary embodiment of the invention.

The absorption and emission spectra of the solution phase cadmium selenide (CdSe) quantum dots are shown in FIG. 3. The characteristic peaks of the first and second exciton states of the quantum dot were observed in the long wavelength region of the absorption spectrum followed by the broad continuum absorption at shorter wavelengths. The bottom trace of FIG. 3 shows the emission spectrum of the CdSe quantum dots with 405 nm optical excitation while the upper trace (offset for clarity) shows the emission spectrum of the sample upon continuous X-ray excitation. The same emission was observed for both excitation sources. The difference in the observed widths of the 405 nm and X-ray emission spectra is attributed to the lower monochromator resolution used to record the X-ray emission.

Quantum Dot-Polymer Composite Characterization

The quantum dot polymer composite thin films were prepared by mixing water soluble polyvinyl alcohol (PVA) polymer with aqueous quantum dots. The thin film composite materials were made using quantum dots that have an emission maximum at 640 nm in aqueous solution and are designated QD640. High concentrations of quantum dots were used to maximize the scintillation intensity. For example, two quantum dot thin film samples with 10 wt. % and 35 wt. % QD640 in PVA. The 10 wt % QD640 sample had better uniformity across the film surface than the 35 wt % sample. The aggregate regions of the 35 wt % had the brightest emission intensity and showed that uniform high density quantum dot samples produce high scintillation efficiency.

Figure 4:
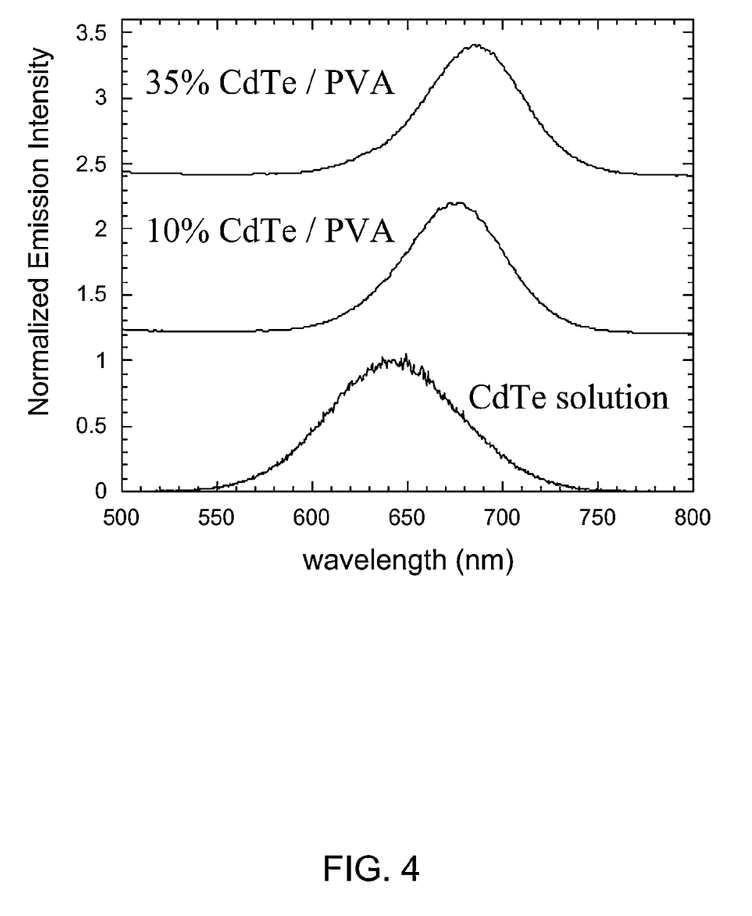
FIG. 4 depicts emission spectra of CdTe640 quantum dots, in accordance with an exemplary embodiment of the invention.

The emission wavelength of the quantum dots shifts to lower energy when the quantum dots were embedded in the polymer matrix. FIG. 4 shows the emission spectrum of the QD640 quantum dots in solution together with the 10 wt % PVA film and the 35 wt % PVA film with excitation at 405 nm.

Figure 5:
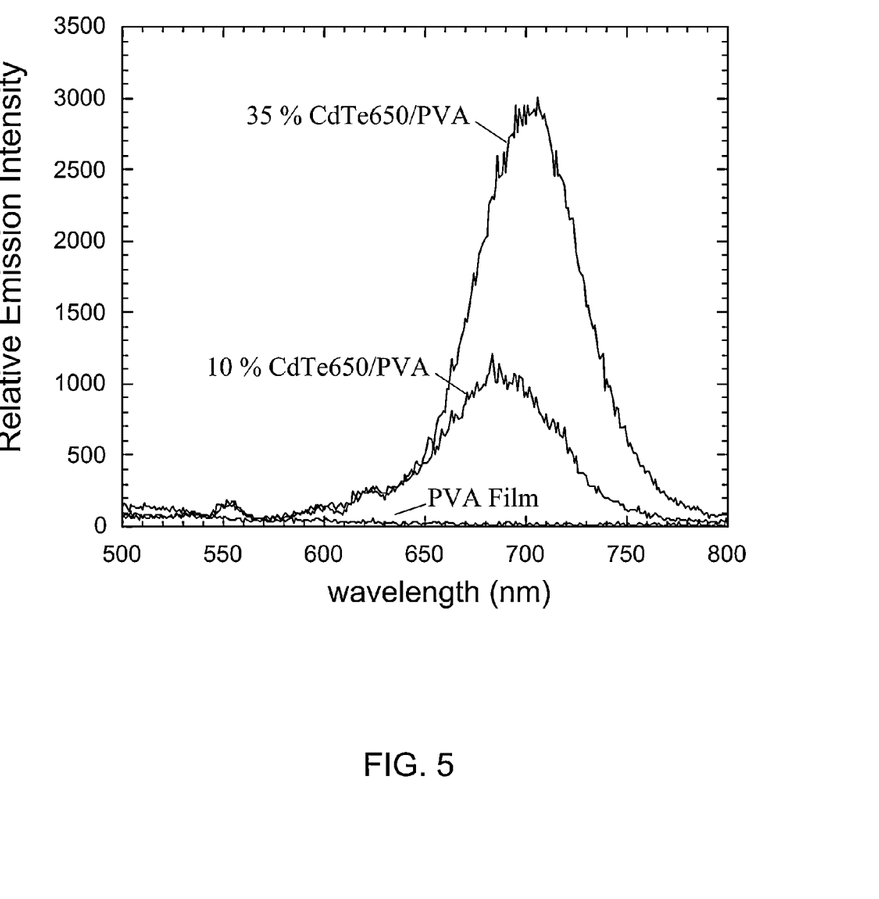
FIG. 5 shows X-ray induced luminescence from a PVA film including quantum dots, in accordance with an exemplary embodiment of the invention.

The spectra show a red shift of 31 nm for the 10 wt % sample and 42 nm for the 35 wt % sample. FIG. 5 shows the spectrum of the relative emission intensity of the X-ray induced luminescence from the 10% quantum dot—PVA sample, the 35% quantum dot—PVA sample, together with a blank polyvinyl alcohol film. The spectra were recorded under identical conditions and the relative peak areas show that the polymer film with 35% quantum dot loading has 2.5 times higher emission intensity.

Fluorescence Lifetimes of Quantum Dots

The fluorescence lifetimes of the quantum dots in solution and in the polymer matrix were less than one microsecond. The fast and bright emission intensity of the quantum dots can be used for high frame rate X-ray imaging systems. The fluorescence lifetime also provides information about the excited state dynamics of the quantum dots. The time resolved fluorescence of the solid phase and liquid phase samples were recorded at discrete wavelengths across the spectral emission band. The time resolved measurements were carried out using time correlated single photon counting methods (TCSPC). TCSPC uses the photon arrival statistics based on the time interval between the excitation of the sample and the detection of a single photon from the sample to measure the time dependent emission intensity. The excitation source was a collimated pulsed picosecond diode laser (PicoQuant; laser head LDH-P-C-400M; driver PDL 800-B) with a maximum power output of 20 mW. The laser pulse frequency was controlled by an external pulse generator (HP 2012B) and was typically 100 to 500 kHz. Wavelength selection was accomplished using a short path ⅛ meter monochromator with 100 micron optical fibers at the entrance and exit ports. The emission from the sample was directly coupled into the fiber optic by placing the fiber optic proximal to the excitation spot in solid samples or excitation line in liquid samples. The light from the optical fiber at the exit of the monochromator is coupled by a lens to a CMOS Geiger mode avalanche photodiode also referred to as a Single Photon Avalanche Diode or SPAD. The lens coupling of the light to the detector provided room to insert wavelength selection filters to block stray light including stray laser light. The photon counting detector was a single element of a 16-element linear array of 30 micron diameter detectors on a 300 micron pitch.

Figure 6:
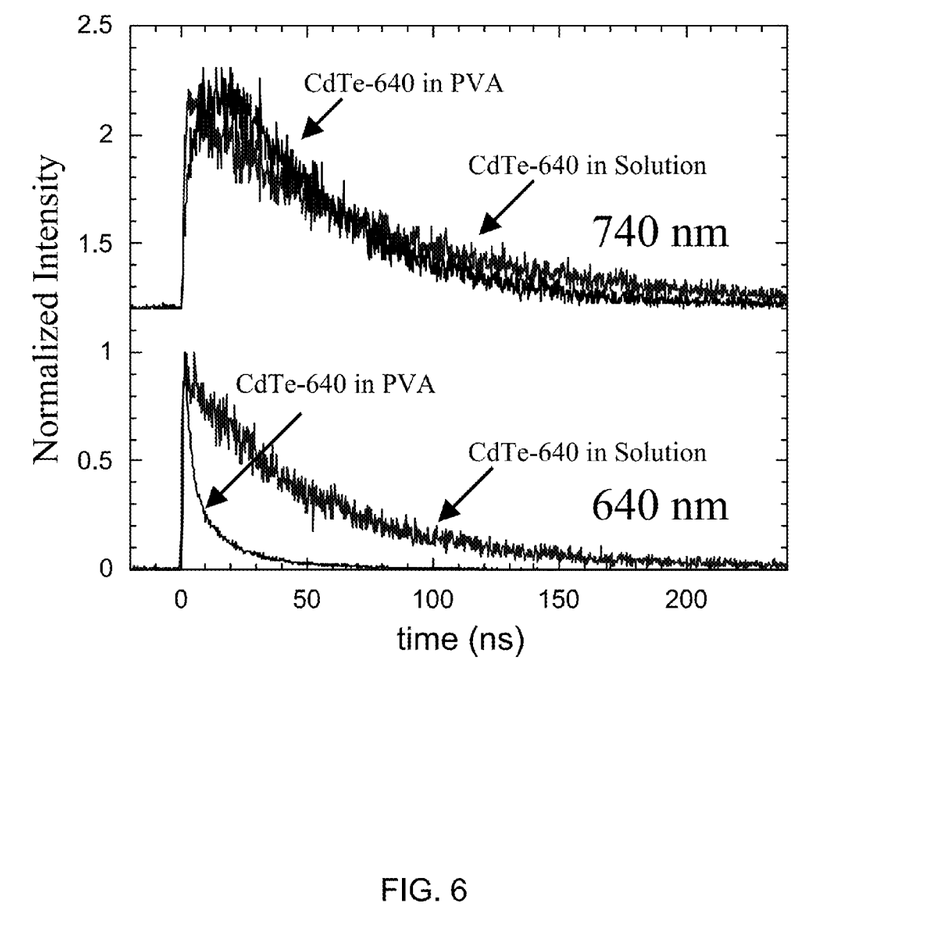
FIG. 6 illustrates time dependent fluorescence emission decay of CdTe-640 quantum dots.

FIG. 6 shows the wavelength resolved fluorescence lifetimes measured for the CdTe640 quantum dots in solution and in the polymer matrix with 405 nm excitation. The fluorescence lifetime was measured at 20 nm intervals across the emission band. The figure shows the 640 nm and 740 nm measurements for both the solution phase sample and the polymer matrix sample where at the short wavelength, high energy edge and long wavelength low energy edge of the emission envelope. The figure illustrates the differences in the photoluminescence decay between the solution phase quantum dots and the polymer matrix bound quantum dots. The fluorescence lifetimes of the solution phase quantum dots are well characterized by a single exponential lifetime. The fluorescence lifetimes of the CdTe640 quantum dots in the PVA matrix show very fast decay at higher energy and a rise time followed by a longer decay time at lower energy emission.

Exciton Harvesting and Energy Transfer with PPO

Figure 7:
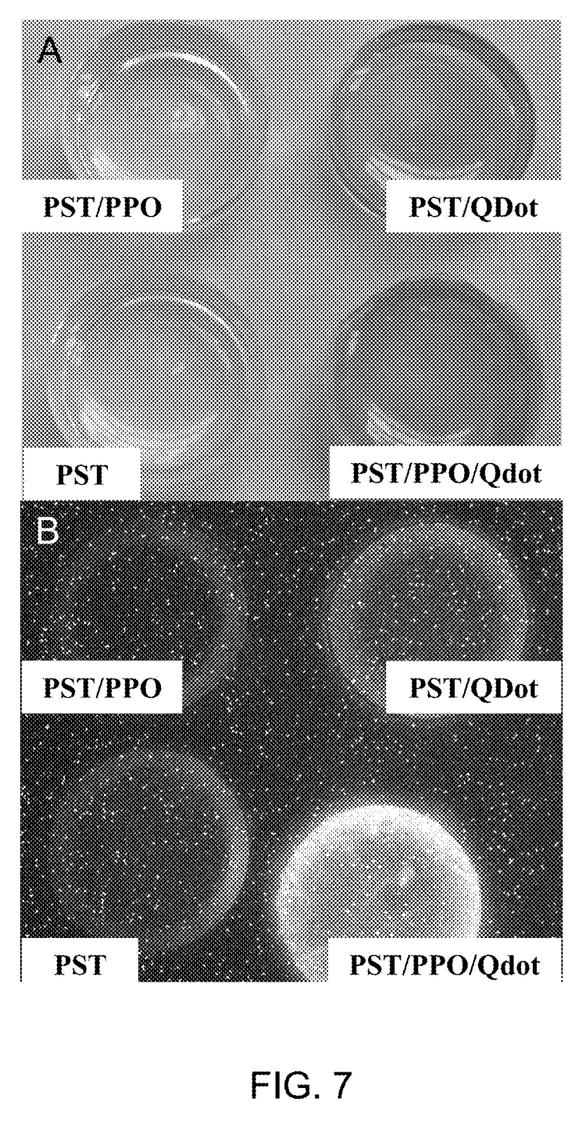
FIG. 7A-7B depict brightfield and X-ray induced fluorescence images of quantum dot-polymer composites, respectively, in accordance with an exemplary embodiment of the invention.

X-ray induced luminescence was measured from polystyrene samples that contain quantum dots, PPO, or quantum dots with PPO. CdSe/ZnS core—shell quantum dots with 607 nm emission (QD607) were used. A set of four samples was prepared that included a sample with 0.2% PPO and 0.2% quantum dot in polystyrene, a sample with 0.2% PPO in polystyrene, a sample with 0.2% quantum dots, and a blank polystyrene sample. Solid disk samples were cast with a 1 cm diameter and the ends of the sample were polished to produce a 3 mm thick disk. FIG. 7 shows a photograph of the samples recorded under ambient lighting conditions, together with the image of all of the samples under X-ray excitation. The emission from the samples that contain only PPO or only quantum dot were not significantly brighter than the blank polystyrene. In contrast, the sample with the PPO and quantum dot is brighter and shows the cooperative impact of the PPO and quantum dot excitation and subsequent energy transfer.

X-ray Imaging with Quantum Dot Scintillator Compositions

Figure 8:
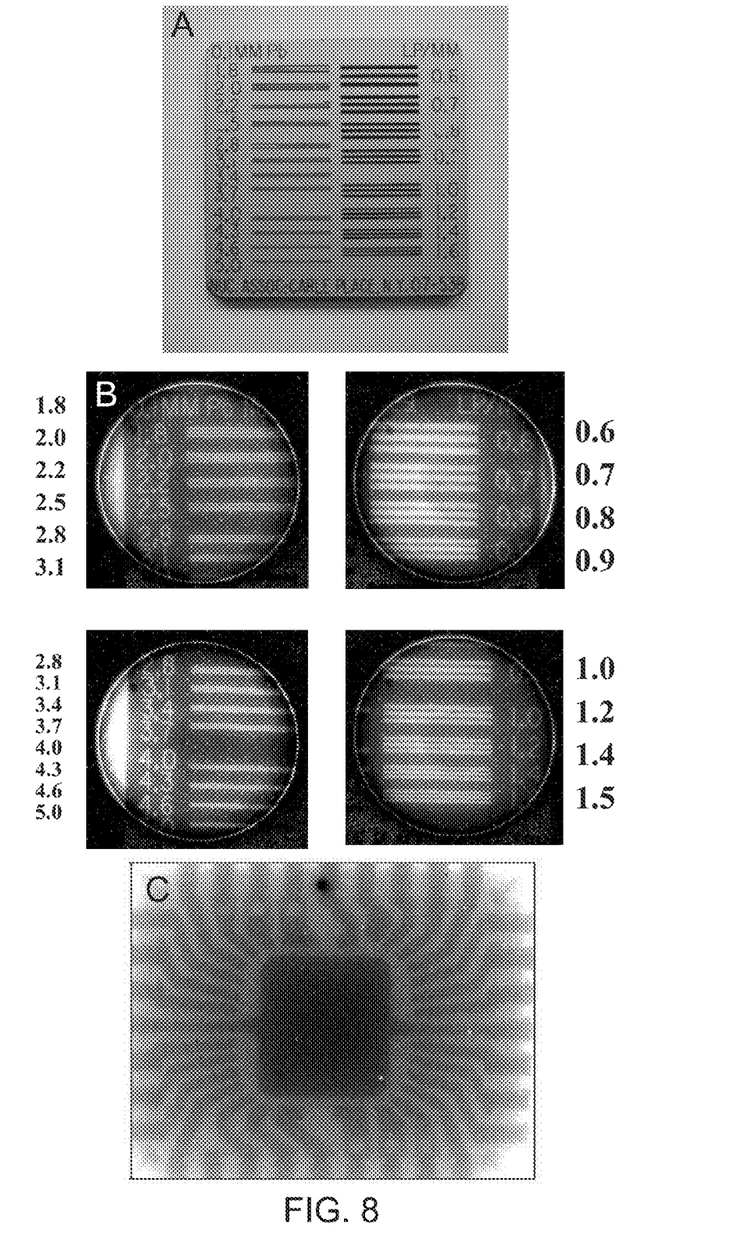
FIG. 8A-8C show line pair phantom and X-ray images acquired with scintillator compositions of the present invention, in accordance with exemplary embodiments of the invention.

The quantum dot—polymer composite thin films were used to demonstrate X-ray imaging using the quantum dot scintillators described herein. Thin films of the 10% CdTe640 quantum dots in polyvinyl alcohol were cast onto fiber optic waveguide plates to produce a 65-micron thick film. The quantum dot—polymer film and substrate were coupled to the detector array using a permanently bonded 3 to 1 fiber optic taper. The images were recorded using a thermoelectrically cooled Photometrics CE200A CCD camera having a 512×512 detector array with 19 micron pixels. The phantoms to be imaged were placed directly above the quantum dot loaded polymer film in the path of the X-ray source. The excitation source for the images was a Gendex X-ray source operating at 15 mA with 60 kVp. The 10% CdTe640 film had the best uniformity with high quantum dot concentration. This sample was used to recorded images of a line pair phantom shown in FIG. 8A. The active area of the scintillating quantum dot film was 25 mm in diameter, which is smaller than the line pair phantom. Multiple images of the phantom were recorded with the thin film sample at different regions of the phantom (FIG. 8B). The four X-ray images of the line pair phantom are shown in FIG. 8B. The lines per mm for each section are shown outside the images.

As depicted in FIG. 8C, the quantum dot scintillators can achieve high spatial resolution. A spin coated thin film of CdTe-610 quantum dots in a polyvinyl alcohol film was prepared. The film was coupled to a CCD camera used for synchrotron-related imaging applications. Low energy X-rays (12 keV) were used to produce an X-ray radiograph of an IC chip in which the 25 μm bond wires are resolved, demonstrating high resolution imaging capabilities of the quantum dot scintillator.

Detection of Alpha particles and gamma rays

Figure 9:
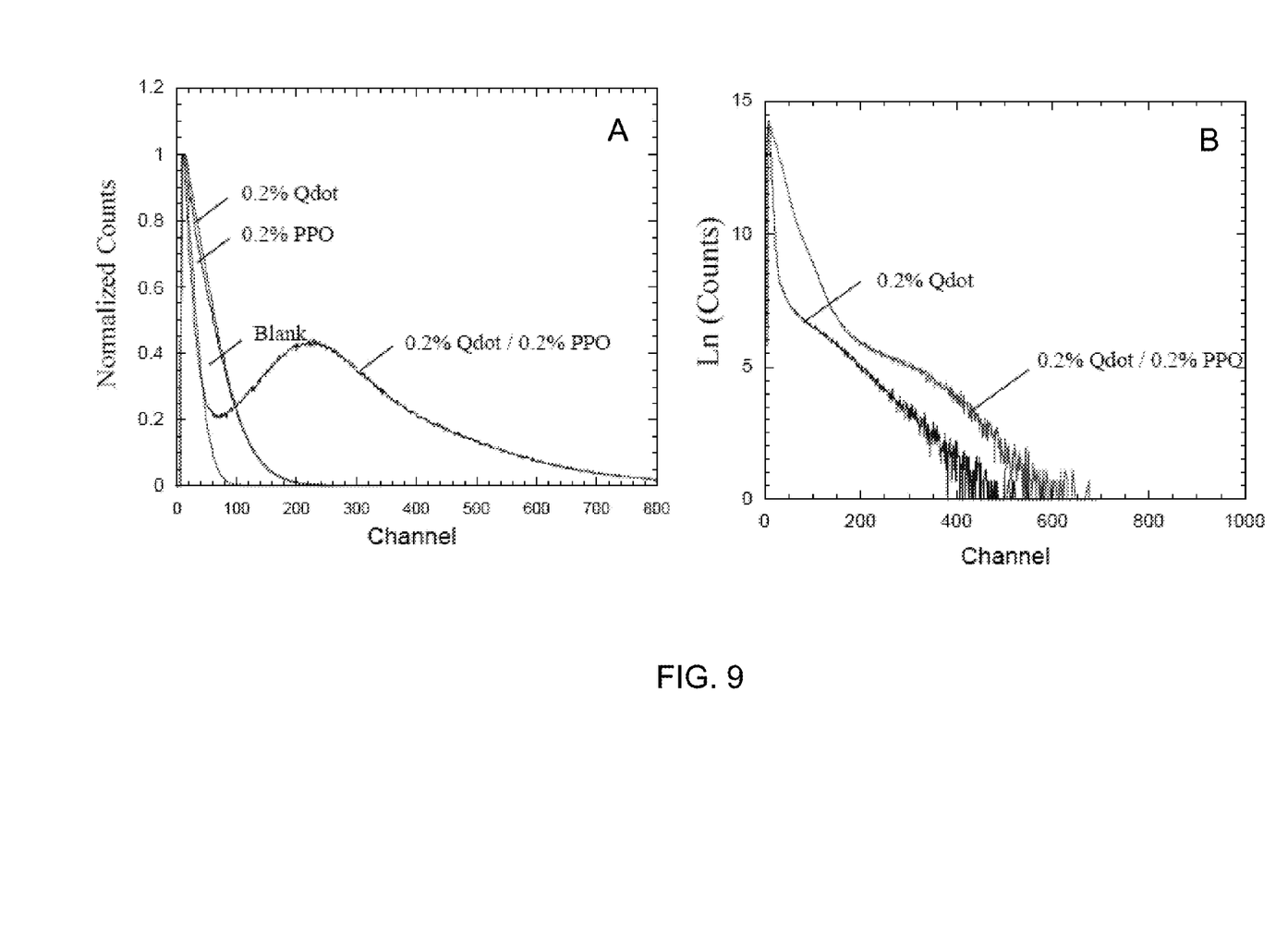
FIGS. 9A and 9B illustrate energy spectra of scintillator compositions irradiated with alpha particles and gamma rays, respectively, in accordance with an exemplary embodiment of the invention.

FIG. 9A shows the response of the various quantum dot scintillators to 241Am αparticles. As shown, the blank specimen did not show any response to α particles, where as the combination of quantum dots and PPO in polymer demonstrated the highest response. FIG. 9B shows a corresponding response of various quantum dot scintillators to 122 keV γ-rays from 57Co source.

The specific dimensions of any of the apparatuses, devices, systems, and components thereof, of the present invention can be readily varied depending upon the intended application, as will be apparent to those of skill in the art in view of the disclosure herein. Moreover, it is understood that the examples and embodiments described herein are for illustrative purposes only and that various modifications or changes in light thereof may be suggested to persons skilled in the art and are included within the spirit and purview of this application and scope of the appended claims. Numerous different combinations of embodiments described herein are possible, and such combinations are considered part of the present invention. In addition, all features discussed in connection with any one embodiment herein can be readily adapted for use in other embodiments herein. The use of different terms or reference numerals for similar features in different embodiments does not necessarily imply differences other than those expressly set forth. Accordingly, the present invention is intended to be described solely by reference to the appended claims, and not limited to the preferred embodiments disclosed herein.

What is claimed is:

1. An X-ray imaging device, comprising a quantum dot scintillator composition comprising a quantum dot, a host material, and a quantum dot anti-aggregation agent, the scintillator composition operably coupleable to a photodetector assembly for detecting X-rays.

2. The device of claim 1, wherein the quantum dot anti-aggregation agent is octadecylamine.

3. The device of claim 1, wherein the scintillator composition comprises a detector portion, wherein the detector portion comprises a scintillator screen that is adapted to be incorporated into the X-ray imaging device.

4. The device of claim 1, wherein the device is configured for detection at a rate faster than about 30 frames per second.

5. The device of claim 1, wherein the photodetector assembly comprises a photomultiplier tube, a photodiode, a PIN detector, a charge-coupled device, or an avalanche detector.

6. The device of claim 1, further comprising a radiation source.

7. The device of claim 1, further comprising a computer system coupled to the photodetector assembly so that the computer system outputs image data in response to detected radiation, wherein the computer system comprises instructions for constructing an image from detected radiation.

8. The device of claim 1, wherein the quantum dot is a doped quantum dot, a core-only quantum dot, or a core-shell quantum dot.

9. The device of claim 8, wherein the doped quantum dot comprises Zn:Se and a dopant.

10. The device of claim 8, wherein the core-only quantum dot is CdSe, CdTe, PbSe, or CdSe/ZnS.

11. The device of claim 1, wherein the host material comprises a polymer, wherein the polymer comprises polystyrene, polyvinyl alcohol, or polymethyl methacrylate.

12. The device of claim 1, wherein the scintillator composition further comprises a quantum dot emission enhancer.

13. The device of claim 1, wherein the scintillator composition is a film having a thickness of less than about 1 mm or a thickness ranging from about 20 microns to about 100 microns and the device is configured to detect X-rays.

* * * * *